Oct. 19, 1948.  E. A. LONGENECKER  2,451,965
MOTOR BICYCLE

Filed Sept. 1, 1945  2 Sheets-Sheet 1

INVENTOR.
E. A. Longenecker
BY
Morsell & Morsell
ATTORNEYS.

Oct. 19, 1948.  E. A. LONGENECKER  2,451,965
MOTOR BICYCLE
Filed Sept. 1, 1945  2 Sheets-Sheet 2

INVENTOR.
E. A. Longenecker
BY
Morsell & Morsell
ATTORNEYS.

Patented Oct. 19, 1948

2,451,965

UNITED STATES PATENT OFFICE 2,451,965

MOTOR BICYCLE

Ernst A. Longenecker, Milwaukee, Wis., assignor to Hart-Carter Company, Peoria, Ill., a corporation of Delaware Application September 1, 1945, Serial No. 614,010

11 Claims. (Cl. 180—33)

This invention relates to improvements in motor bicycles.

On the usual type of motor bicycle there is only one speed ratio possible between the engine and the rear wheel. In order to provide a ratio which will cause the bicycle to travel at a satisfactory speed over level ground there is frequently insufficient power for climbing a steep hill. Also, in city riding it is very desirable to have means for changing the speed ratio to meet different conditions.

It is a general object of the present invention to provide a driving unit for a bicycle, wherein the rear wheel is driven by engagement between friction roller means and the tire, the said means including a novel arrangement for changing the speed ratio between the engine and the tire, without adding to the expense of manufacture, and without adding complicated controls.

A more specific object of the invention is to provide a construction as above described wherein the motor assembly is pivotally supported to rock in an arc in a vertical plane, there being a tire engaging friction roller on each side of the pivot, and there being means for causing said friction rollers to be driven constantly at different speeds by the engine. The arrangement is such that either roller may be brought into engagement with the tire at will, depending upon the speed ratio desired, it being also possible to disengage both friction rollers from the tire to effect a neutral position and permit operation of the bicycle by means of the pedals.

A further, more specific object of the invention is to provide a construction as above described wherein the shaft for one of the friction rollers is equipped with a driving pulley of relatively small diameter and wherein the shaft for the other friction roller is equipped with a driving pulley of a substantially larger diameter, the two pulleys being constantly driven by the same endless belt.

A further object of the invention is to provide a driving unit for a bicycle which may be sold in the form of an attachment for quick connection with any standard bicycle.

With the above and other objects in view, the invention consists of the improved motor bicycle, and all its parts and combinations, as set forth in the claims, and all equivalents thereof.

In the accompanying drawings, illustrating one complete embodiment of the preferred form of the invention, in which the same reference numerals designate the same parts in all of the views.

Figure 1:
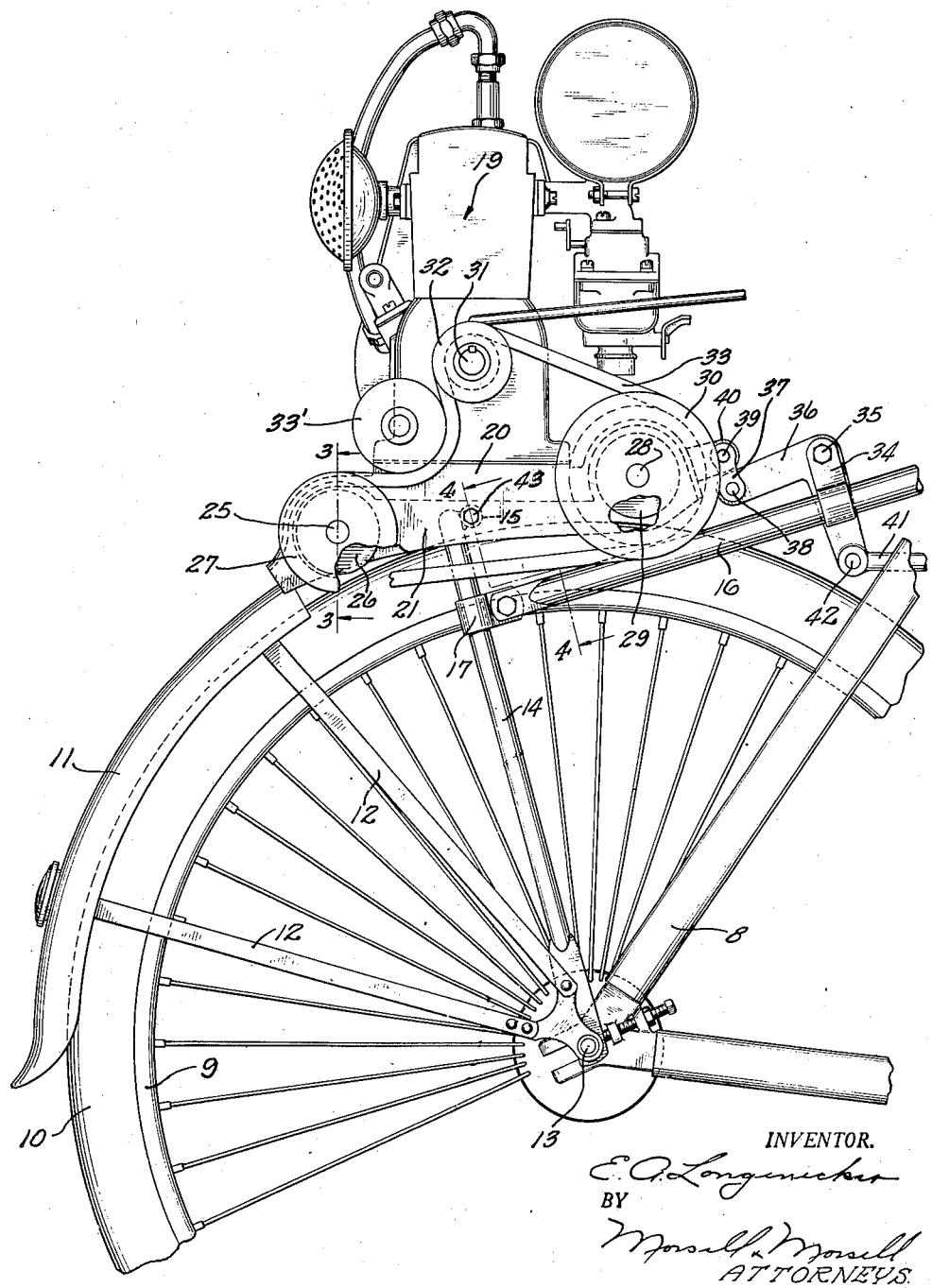
Fig. 1 is a side elevational view showing the improved driving unit in connection with the rear wheel of a bicycle, only part of the bicycle being illustrated, and the remainder being broken away. In this view the friction rollers are illustrated in neutral position.

Referring more particularly to the drawings, the numeral 8 designates the usual rear fork portion of a standard bicycle which rotatably supports a rear wheel 9 equipped with a tire 10. There may be a fragmentary mud guard 11 supported by U-shaped brackets 12.

Figures 4, 5:
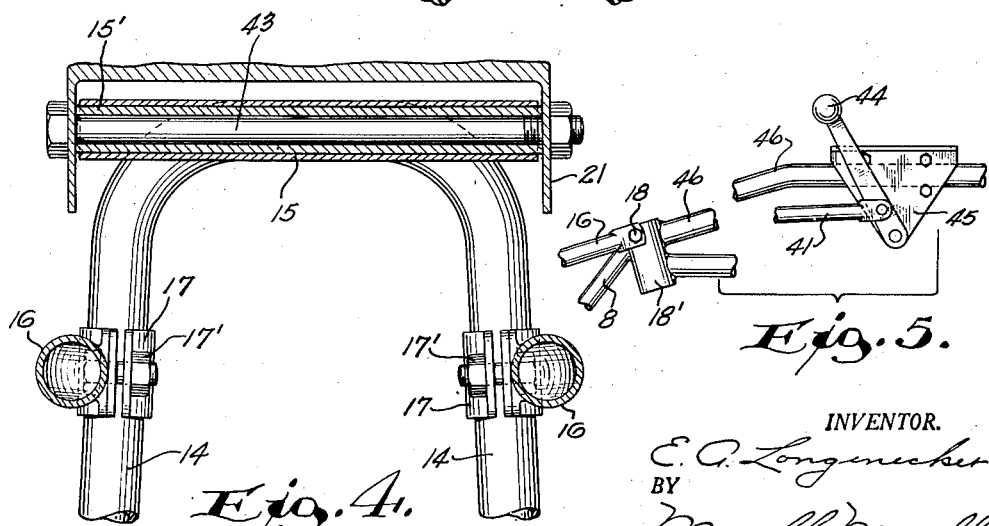
Fig. 4 is a sectional view on an enlarged scale taken on line 4—4 of Fig. 1.
Fig. 5 is a fragmentary side elevational view showing the connection of one of the supports for the motor unit with the rear of the seat post of the bicycle, and showing the hand lever for controlling the tilting movement.

Secured in position by the nuts 13 on the ends of the rear wheel bearing spindle is a U-shaped brace 14 formed of suitable metal tubing. Secured to the upper horizontal portion of the brace 14 is a sleeve 15 provided with a suitable bushing 15'. Tubular tie rods 16 are suitably connected by means of clamps 17 at their rear ends to the sides of the U-shaped brace 14. Nuts 17' (see Fig. 4) may be tightened to adjustably connect the tie rods in position. The forward ends of the members 16 are connected to a bolt 18 adjacent the seat post 18' of the bicycle as shown in Fig. 5. It is apparent, therefore, that the supports for the motor unit may be quickly attached to any standard bicycle.

The improved driving unit comprises an internal combustion engine 19 mounted on a base 20. Depending from the bottom of the base 20 is a housing 21 for the friction rollers. This housing is generally an inverted channel in cross section and is formed with a partially cylindrical enlargement 22 at its forward end and 23 at its rear end. The sides of the cylindrical enlargement 23 are equipped with bearing members 24 (see Fig. 3) within which a shaft 25 is journalled. Within the cylindrical enlargement 23 and keyed to the shaft 25 is a friction roller 26. One end of shaft 25 projects exteriorly beyond the bearing 24 and is equipped with a driving pulley 27 of relatively small size.

Figure 3:
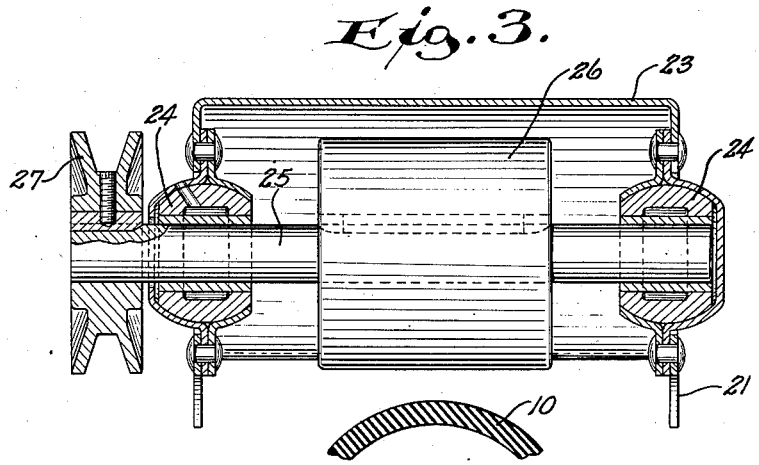
Fig. 3 is a sectional view on an enlarged scale taken on line 3—3 of Fig. 1.

At the forward end of the roller housing in the cylindrical enlargement 22 is another transverse shaft 28 which is journalled in bearings like the bearings 24 shown in Fig. 3. Keyed to the shaft 28 is a friction pulley 29. One end of the shaft 28 projects exteriorly beyond the side of the housing, and rigidly mounted on said end is a low speed driving pulley 30 (see Fig. 1) which has a diameter substantially larger than the diameter of the high speed driving pulley 27. The drive shaft 31 of the engine 19 is equipped with a pulley 32, and there is an endless belt 33 extending around the pulleys 32, 27 and 30. The portion of the belt between the pulleys 32 and 27 may be engaged by an adjustable idler pulley 33'.

Extending transversely of the tie rods 16 and supported on bracket members 34 is a pivot bolt 35. Pivoted on said bolt is a bell crank lever 36. One end of a short link 37 is pivotally connected as at 38, to the rear extension of the bell crank lever. The other end of the link 37 is pivotally connected, as at 39, to an ear 40 projecting from the friction roller housing 21. An operating rod 41 is pivotally connected, as at 42, to the other arm of the bell crank lever 36. The operating rod 41 may extend forwardly where it is pivotally connected to a hand lever 44. The hand lever is pivotally connected to a plate 45 and the latter is clamped to the bar 46 of the bicycle frame as is illustrated in Fig. 5. Manipulation of the lever 44 will permit the rider to tilt the driving unit to the "low," "high," or "neutral" position as required.

A bolt 43 (see Fig. 4), which extends through the sides of the friction roller housing 21 and through the bushing 15', serves to support the motor and associated parts for tilting movement through an arc in a vertical plane.

Figure 2:
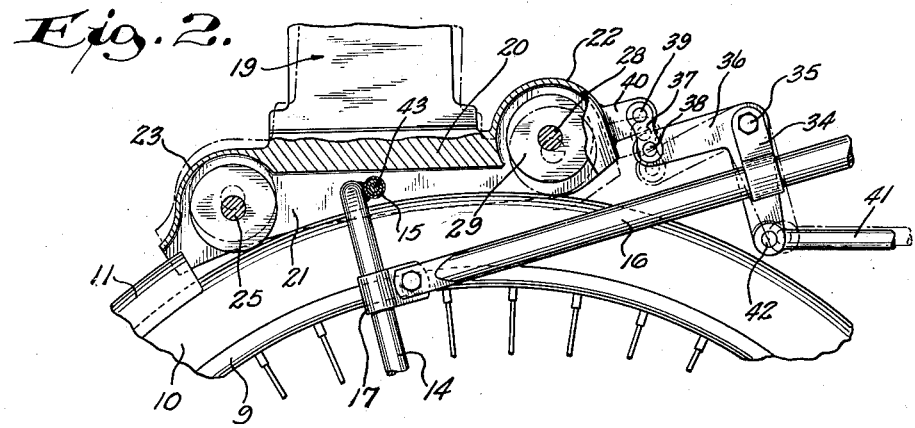
Fig. 2 is a fragmentary side elevational view, with parts broken away and shown in vertical section, the high speed driving position of the unit being illustrated in full lines and the low speed driving position in dot and dash lines.

In use of a bicycle equipped with the improved motor unit, when the motor is in the tilted position of Fig. 1 both of the friction pulleys 26 and 29 will be out of engagement with the tire 10. This may be used as a neutral position when the bicycle is forced to stop at a stop light or when it is desired to keep the motor idling while the bicycle is not in motion. The position of Fig. 1 may also be used when it is desired to operate the bicycle by the usual pedals with the motor shut off. By pushing rearwardly on the operating rod 41 the parts will be moved to the full line position of Fig. 2 to cause the high speed friction roller 26 to drivingly engage the tire. The friction roller 26 is driven at a relatively high speed because of the relatively small size of its driving pulley 27. If a low speed drive is desired, then the operating rod 41 is pulled forwardly to move the parts to the dot and dash line position of Fig. 2 and cause disengagement of the high speed friction roller 26 and engagement of the low speed friction roller 29 with the tire 10.

It is apparent that the construction provides for a change in the speed ratio between the engine and the rear tire by the use of very simple and inexpensive mechanism. It is also clear that the entire motor unit may be manufactured and sold at a relatively low cost and that it may be marketed as an attachment for standard bicycles.

Various changes and modifications may be made without departing from the spirit of the invention, and all of such changes are contemplated as may come within the scope of the claims.

What I claim is:

1. In a motor bicycle, a driving unit including an engine, supporting structure on the bicycle, including a pivotal connection between said driving unit and said structure supporting said unit with said engine on the bicycle adjacent and above the rear wheel thereof for tilting movement in a vertical plane, at least one friction roller rotatably carried by said unit on one side of said pivotal connection and positioned for engagement with the rear wheel tire when the unit with the engine is tilted a predetermined distance in one direction, at least one friction roller rotatably carried by said unit on the other side of said pivotal connection and positioned for engagement with the rear wheel tire when the unit with the engine is tilted a predetermined distance in the opposite direction, and means driven by said engine for driving said rollers at different speeds.

2. In a motor bicycle, a driving unit including an engine, supporting structure on the bicycle including a pivotal connection between said driving unit and said structure supporting said unit with said engine on the bicycle adjacent and above the rear wheel thereof for tilting movement in a vertical plane, at least one friction roller rotatably carried by said unit on one side of said pivotal connection and positioned for engagement with the rear wheel tire when the unit with the engine is tilted a predetermined distance forwardly, at least one friction roller rotatably carried by said unit on the other side of said pivotal connection and positioned for engagement with the rear wheel tire when the unit with the engine is tilted a predetermined distance rearwardly, and means driven by said engine for driving said rollers simultaneously at different speeds.

3. In a motor bicycle, a driving unit including an engine, supporting structure on the bicycle including a pivotal connection between said driving unit and said structure supporting said unit with said engine on the bicycle adjacent and above the rear wheel thereof for tilting movement in a vertical plane, at least one friction roller rotatably carried by said unit on one side of said pivotal connection and positioned for engagement with the rear wheel tire when the unit with the engine is tilted a predetermined distance in one direction, at least one friction roller rotatably carried by said unit on the other side of said pivotal connection and positioned for engagement with the rear wheel tire when the unit with the engine is tilted a predetermined distance in the opposite direction, said engine being mounted substantially over the pivot and between said rollers, and connections between said engine and said friction rollers for driving said rollers simultaneously at different speeds.

4. In a motor bicycle, a driving unit including an engine, supporting structure on the bicycle including a pivotal connection between said driving unit and said structure supporting said unit with said engine on the bicycle adjacent and above the rear wheel thereof for tilting movement in a vertical plane, at least one friction roller rotatably carried by said unit on one side of said pivotal connection and position for engagement with the rear wheel tire when the unit with the engine is tilted a predetermined distance in one direction, at least one friction roller rotatably carried by said unit on the other side of said pivotal connection and positioned for engagement with the rear wheel tire when the unit with the engine is tilted a predetermined distance in the opposite direction, and means driven by said engine for driving said rollers, said means including a different sized pulley connected to each friction roller and endless belt means for rotating said pulleys simultaneously.

5. In a motor bicycle, a driving unit including an engine, supporting structure on the bicycle, including a pivotal connection between said driving unit and said structure supporting said unit with said engine on the bicycle adjacent and above the rear wheel thereof for tilting movement in a vertical plane, a friction roller rotatably carried by said unit on one side of said pivotal connection and position for engagement with the rear wheel tire when the unit with the engine is tilted a predetermined distance in one direction, a pulley of relatively small diameter connected to said roller for rotation therewith, a friction roller rotatably carried by said unit on the other side of said pivotal connection and positioned for engagement with the rear wheel tire when the unit with the engine is tilted a predetermined distance in the opposite direction, said engine being mounted substantially over the pivot and between said rollers, a pulley of relatively large diameter connected to said roller for rotation therewith, and means driven by said engine including an endless belt connecting said pulleys for driving said friction rollers simultaneously at different speeds.

6. In a motor bicycle, a driving unit including an engine having a drive shaft, supporting structure on the bicycle including a pivotal connection between said driving unit and said structure supporting said unit with said engine on the bicycle adjacent and above the rear wheel thereof for tilting movement in a vertical plane, a friction roller rotatably carried by said unit on one side of said pivotal connection and positioned for engagement with the rear wheel tire when the unit with the engine is tilted a predetermined distance forwardly, a pulley of relatively small diameter connected to said roller for rotation therewith, a friction roller rotatably carried by said unit on the other side of said pivotal connection and positioned for engagement with the rear wheel tire when the unit with the engine is titled a predetermined distance rearwardly, a pulley of relatively large diameter connected to said roller for rotation therewith, a pulley on the engine drive shaft, and an endless belt connecting said three pulleys to drive the friction rollers simultaneously at different speeds.

7. In a motor bicycle, a driving unit including an engine, supporting structure on the bicycle including a pivotal connection between said driving unit and said structure supporting said unit with said engine on the bicycle adjacent and above the rear wheel thereof for forward and rearward tilting movement in a vertical plane, at least one friction roller rotatably carried by said unit on one side of said pivotal connection and positioned for engagement with the rear wheel tire when the unit with the engine is tilted a predetermined distance forwardly, at least one friction roller rotatably carried by said unit on the other side of said pivotal connection and positioned for engagement with the rear wheel tire when the unit with the engine is tilted a predetermined distance rearwardly, means driven by said engine for driving said rollers at different speeds, and means including a bell crank lever for controlling the tilted position of said driving unit.

8. A motor attachment for a bicycle comprising a U-shaped supporting brace adapted to span an upper portion of the rear wheel of a bicycle and having means for connection with opposite side portions of the bicycle frame, tie rods connected at one end to said supporting brace and having means at the opposite end for connection with a forward portion of the bicycle frame, a driving unit including an engine pivotally connected to the top of said supporting brace for tilting movement forwardly and rearwardly of a neutral position in a vertical plane with said engine mounted substantially over said pivotal connection, at least one friction roller rotatably carried by said driving unit on one side of said pivotal connection and positioned for engagement with the rear wheel tire of the bicycle when the unit with said engine is tilted a predetermined distance forwardly, at least one friction roller rotatably carried by said driving unit on the other side of said pivotal connection and positioned for engagement with the rear wheel tire when the unit with said engine is tilted a predetermined distance rearwardly, and means driven by said engine for driving said rollers at different speeds.

9. A motor attachment for a bicycle comprising a U-shaped supporting brace adapted to span an upper portion of the rear wheel of a bicycle and having means for connection with opposite side portions of a bicycle frame, tie rods connected at one end to said supporting brace and having means at the opposite end for connection with a forward portion of the bicycle frame, a driving unit pivotally connected to the top of said supporting brace for tilting movement in a vertical plane, a bell crank lever pivotally connected to said tie rods, means pivotally connecting one arm of said bell crank lever with said driving unit, operating means pivotally connected to the other arm of said bell crank lever and manipulatable to cause tilting of the driving unit, at least one friction roller rotatably carried by said driving unit on one side of the pivotal connection between the driving unit and the supporting brace and positioned for engagement with the rear wheel tire of the bicycle when the unit is tilted a predetermined distance in one direction, at least one friction roller rotatably carried by said unit on the other side of said last-mentioned pivotal connection and positioned for engagement with the rear wheel tire when the unit is tilted a predetermined distance in the opposite direction, and means for driving said rollers at different speeds.

10. A motor attachment for a bicycle comprising a U-shaped supporting brace adapted to span an upper portion of the rear wheel of a bicycle and having means for connection with opposite side portions of the bicycle frame, tie rods connected at one end to said supporting brace and having means at the opposite end for connection with a forward portion of the bicycle frame, a driving unit pivotally connected to the top of said supporting brace for tilting movement in a vertical plane, said unit including an engine having a drive shaft, a friction roller rotatably carried by said unit on one side of said pivotal connection and positioned for engagement with the rear wheel tire when the unit is tilted a predetermined distance in one direction, a pulley of relatively small diameter connected to said roller for rotation therewith, a friction roller rotatably carried by said unit on the other side of said pivotal connection and positioned for engagement with the rear wheel tire when the unit is tilted a predetermined distance in the opposite direction, a pulley of relatively large diameter connected to said roller for rotation therewith, a pulley on the engine drive shaft, and an endless belt connecting said three pulleys to drive the friction rollers simultaneously at different speeds.

11. In a motor bicycle, a driving unit including an engine, supporting structure on the bicycle including a pivotal connection between said driving unit and said structure supporting said unit with said engine on the bicycle adjacent and above the rear wheel thereof for tilting movement in a vertical plane forwardly and rearwardly of a neutral position, said pivotal connection being centrally located below said engine, at least one friction roller rotatably carried by said unit forward of said pivotal connection and positioned for engagement with the rear wheel tire when the unit with the engine is tilted a predetermined distance forwardly, at least one friction roller rotatably carried by said unit to the rear of said pivotal connection and positioned for engagement with the rear wheel tire when the unit with the engine is tilted a predetermined distance rearwardly, and means driven by said engine for driving said roller at different speeds.

ERNST A. LONGENECKER.

REFERENCES CITED

The following references are of record in the file of this patent:

UNITED STATES PATENTS

| Number | Name | Date |
|---|---|---|
| 715,889 | Smith | Dec. 16, 1902 |
| 2,031,881 | Evinrude | Feb. 25, 1936 |

FOREIGN PATENTS

| Number | Country | Date |
|---|---|---|
| 383,923 | Great Britain | Nov. 24, 1932 |
| 572,537 | France | Feb. 22, 1924 |